(12) United States Patent
Henson

(10) Patent No.: US 9,327,444 B1
(45) Date of Patent: May 3, 2016

(54) APPARATUSES FOR EXPANDING TUBING AND METHODS OF USE

(71) Applicant: Dale L. Henson, San Jose, CA (US)

(72) Inventor: Dale L. Henson, San Jose, CA (US)

( * ) Notice: Subject to any disclaimer, the term of this patent is extended or adjusted under 35 U.S.C. 154(b) by 0 days.

(21) Appl. No.: 14/826,005

(22) Filed: Aug. 13, 2015

Related U.S. Application Data

(62) Division of application No. 13/734,251, filed on Jan. 4, 2013.

(51) Int. Cl.
*B29C 44/42* (2006.01)
*B29C 55/22* (2006.01)
*B29K 27/12* (2006.01)
*B29K 27/18* (2006.01)
*B29L 23/00* (2006.01)

(52) U.S. Cl.
CPC ............. *B29C 55/22* (2013.01); *B29K 2027/12* (2013.01); *B29K 2027/18* (2013.01); *B29L 2023/00* (2013.01)

(58) Field of Classification Search
USPC .......................... 264/526–535; 425/526–530
See application file for complete search history.

(56) References Cited

U.S. PATENT DOCUMENTS

| | | | | |
|---|---|---|---|---|
| 4,840,552 A | * | 6/1989 | Onishi | B29C 47/0016 264/209.3 |
| 4,998,871 A | * | 3/1991 | Ledoux | B29C 53/08 72/370.23 |
| 6,293,778 B1 | * | 9/2001 | Joseph | B29C 47/0026 425/140 |

* cited by examiner

*Primary Examiner* — Joseph S Del Sole
*Assistant Examiner* — Thukhanh T Nguyen
(74) *Attorney, Agent, or Firm* — Carr & Ferrell LLP

(57) ABSTRACT

Apparatuses for expanding tubing and methods of use are provided herein. An exemplary process may include heating tubing to an expansion temperature, expanding the heated tubing within an expansion chamber by injecting a first fluid within the heated tubing to expand the heated tubing, and constraining expansion of the heated tubing within the expansion chamber by introducing a second fluid between an outer sidewall of the heated tubing and an inner sidewall of the expansion chamber.

13 Claims, 6 Drawing Sheets

| SYMBOL | DESCRIPTION | SYMBOL | DESCRIPTION |
|---|---|---|---|
| | INTEGRATED AIR FILTER AND REGULATOR | (IC/X) | ANALOG INPUT MODULE |
| | MANUAL REGULATOR | (IC/X) | ANALOG OUTPUT MODULE |
| | ELECTRONIC REGULATOR | (TC/X) | TEMPERATURE INPUT MODULE |
| | SOLENOID VALVE | (FE/XX) | FLOW SENSOR |
| | SAFETY POP VALVE | | MASS FLOW CONTROLLER |
| | MANUAL 3 WAY VALVE | (PT/XX) | PRESSURE TRANSDUCER |
| | ROTARY VALVE | (TT/XX) | TEMPERATURE TRANSDUCER |
| | CHECK VALVE | | PLC |
| | LINE FILTER | | MACHINE INTERFACE |
| | CHAMBER | ———— | PROCESS CONNECTION |
| | GAS BOTTLE | –o–o– | DATA CONNECTION |
| | HEAT EXCHANGER | – – – | ELECTRICAL CONNECTION |

APPARATUSES FOR EXPANDING TUBING AND METHODS OF USE

CROSS-REFERENCE TO RELATED APPLICATION

This application is a Divisional, and claims the priority benefit of, U.S. patent application Ser. No. 13/734,251, filed Jan. 4, 2013, and issued on Mar. 29, 2016 as U.S. Pat. No. 9,296,165, the disclosure of which is hereby incorporated by reference in its entirety.

FIELD OF THE INVENTION

The present technology relates generally to apparatuses for expanding tubing and methods of use thereof. More specifically, but not by way of limitation, the present technology may be used to transform tubing into expanded tubing that may be used for a variety of purposes such as manufacturing shrinkable tubing.

BACKGROUND

Heat shrinkable plastic tubing is used in a variety of industries and can be made from many types of plastics or polymeric materials, including elastomers. In some instances, stock tubing is heated to a specified temperature and fluid, such as compressed dry air is pumped into the tubing to increase internal pressure within the tubing. The combination of heat and pressure expands the tubing to a desired diameter. Next, the expanded tubing is cooled while pressure is maintained within the tubing. Once cooled, the tubing remains expanded to the desired diameter. If the tubing is then heated at or above the expansion temperature, it will shrink back to its original diameter.

Most shrinkable plastic tubing is manufactured from polyolefin-based polymers and is used to cover electrical wires, forming an insulating layer. Generally, heat-shrink tubing used in common industrial applications is relatively easy to fabricate from a cross-linked polymer or any other suitable thermoplastic polymers and elastomers that experience strain hardening when stretched or expanded. At high strain, strain hardening takes place within a thermoplastic elastomer (TPE) and converts the TPE from elastic behavior to a more leathery or stiff behavior such that some elasticity is lost in exchange for an increase in tensile strength and modulus.

Many polymeric, elastomeric, and fluoropolymeric materials are used to manufacture heat shrinkable tubing because these materials can be expanded without requiring any external diameter constraint during the manufacturing process. Exemplary materials include, but are not limited to polyester, polyethylene (PE), polyvinylidene fluoride (PVDF), as well as other similar materials that would be known to one of ordinary skill in the art with the present disclosure before them.

A variant of free expanding processes involves cross-linking of polymeric chains of the tubing before expansion. In some instances, the tubing may be subjected to an electron beam which breaks continuous polymeric string bonds. These bonds may then reform and cross-link by connecting with other strings. This cross-linking allows the material to be stretched up to a point (e.g., yield stress point) and then gain more strength via strain hardening than a non-cross linked amorphous material. More specifically, some TPE materials may behave as elastomers until the yield stress has been reached via stretching or expanding of the material. If stretched or expanded past the yield stress the TPE material may undergo plastic flow, part of which may be viscoelastic and part will be permanent set (e.g., strain hardening). Material that has been cross-linked can be stretched further to produce tubing having relatively thin walls. Advantageously, thin walled tubing may be used to insulate aircraft cable where weight reduction is beneficial.

Medical catheters also make use of heat shrink tubing to form hollow and flexible shafts that may be guided through arteries, such as a femoral leg artery. The catheter can pass through the heart and then to other areas of the body via arteries or vessels of suitable diameter. Thus, even very small arteries in the brain can be accessed by means of very small catheters to perform neurovascular procedures.

Small diameter catheters may be manufactured by embedding a wire mesh between layers of tubing material. The resultant product remains flexible but can be navigated around curves and bends within the vascular system. This bending flexibility and torsional stiffness can be obtained in a very small diameter catheter shaft if the walls are sufficiently thin.

Processes for making small diameter catheters may include using outer fluoropolymer tubing which may exert compressive forces on the outer layer of the catheter, when the fluoropolymer tubing is heat shrunk. That is, the catheter may be comprised of one or more tubular layers of material. Shrinkable outer fluoropolymer tubing may be used to compress the layers together.

Fluoropolymers, such as polytetrafluoroethylene (PTFE) melt at a much higher temperature than the typical plastic used for the tubing layers used to manufacture the catheter. Thus, heat applied to the layers of tubing during the shrinking process may occur at temperatures which are high enough to almost melt one or more of the layers, allowing the tubular layers to melt and integrate with a wire layer. The integration of the wire layer allows for production of catheters having relatively thin walls that maintain strength and flexibility. In some instances, the fluoropolymer layer is cut off and discarded after the catheter outer layer is finished.

Other common fluoropolymer materials include, but are not limited to PTFE and fluorinated ethylene propylene (FEP). While these fluoropolymers melt at higher temperatures, the fluoropolymer material may each behave differently during expansion and contraction (e.g., shrinking). Manufacturing shrinkable tubing from fluoropolymer materials is often difficult because these materials lose strength when expanded and must be constrained during the expansion and heating process. If not constrained, these materials may expand to failure.

Common process method for constraining FEP during manufacture require passing of the material through a glass tube that is heated and injected with a high-temperature lubricant such as silicone oil. The silicone oil prevents the tubing from sticking to the glass tube. Deleteriously, this process often results in deposition of silicone oil residue on the expanded tubing. Silicone oil is hydrophobic and spreads across any contacting surface. Moreover, silicone oil is difficult to remediate and may contaminate any area where it is present. Thus, in catheter manufacturing systems, any amount of silicone oil can spread through the process environment and is very difficult to remove. Silicone oil may repel water (as well as paint) and may also interfere with gluing or fusing processes that are used to make catheters.

SUMMARY OF THE PRESENT TECHNOLOGY

According to some embodiments, the present technology may be directed to a process that includes: (a) heating tubing to an expansion temperature; (b) expanding the heated tubing within an expansion chamber by injecting a first fluid within the heated tubing to expand the heated tubing; and (c) constraining expansion of the heated tubing within the expansion chamber by introducing a second fluid between an outer sidewall of the heated tubing and an inner sidewall of the expansion chamber.

According to some embodiments, the present technology may be directed to an apparatus that includes: (a) a heater that increases a temperature of tubing; (b) an expansion chamber that receives the tubing; and (c) a control module comprising a processor that executes logic stored in memory to perform operation comprising: (i) expanding the heated tubing within the expansion chamber by injecting a first fluid within the tubing to expand the tubing; and (ii) constraining expansion of the tubing within the expansion chamber by introducing a second fluid between an outer sidewall of the heated tubing and an inner sidewall of the expansion chamber.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 2B is a legend of objects that describe components of FIG. 2A;

DESCRIPTION OF EXEMPLARY EMBODIMENTS

Figure 1:
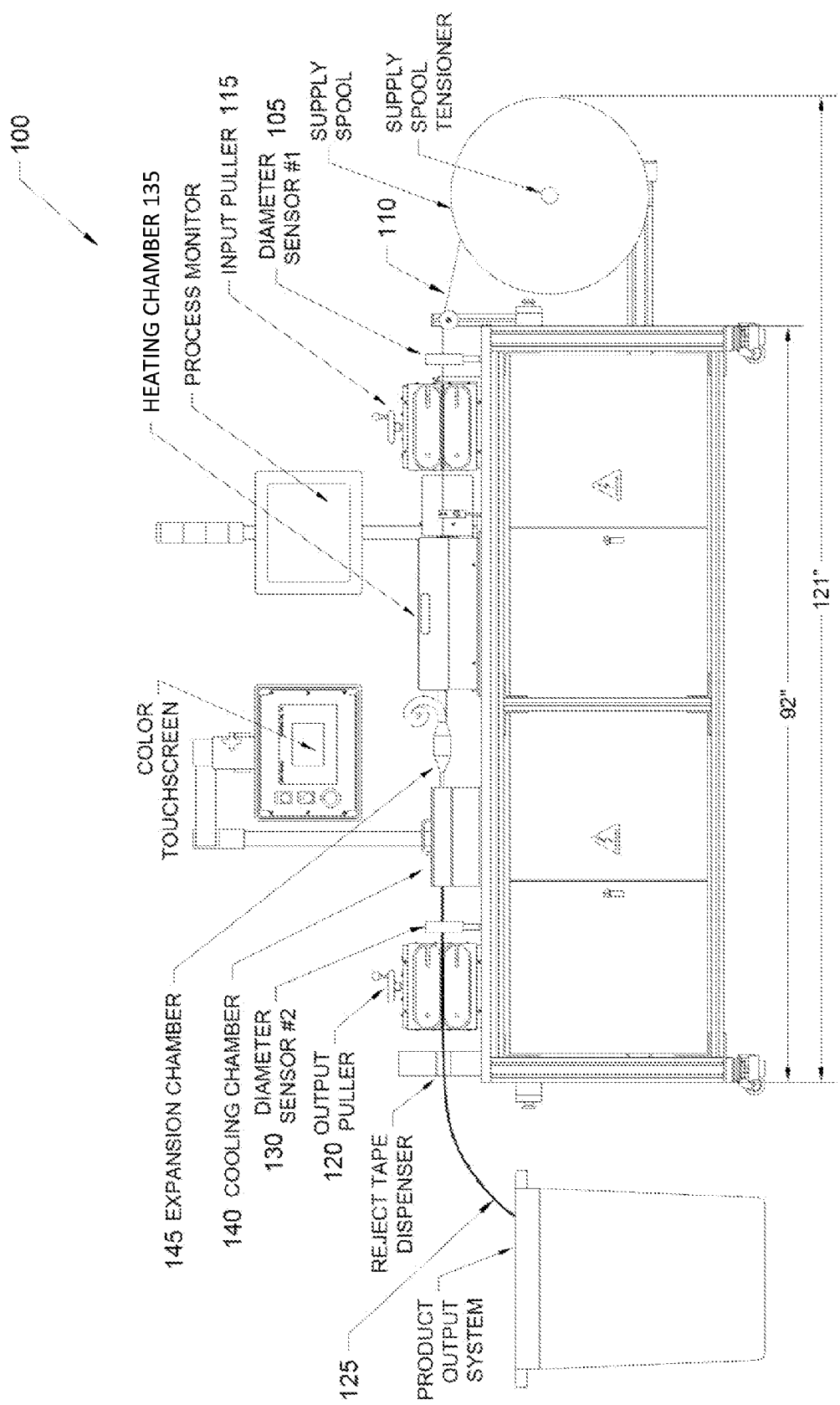
FIG. 1 is a front perspective view of an apparatus, constructed in accordance with the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 is a perspective view of an exemplary apparatus 100 that is used to process expandable tubing. Generally, the apparatus 100 may be used to expand stock tubing from an initial diameter to a second and larger diameter. According to some embodiments, the stock tubing may comprise a variety of materials such as plastics, polymers, elastomers, fluoropolymers, and so forth. Additionally, the apparatus 100 may be used to expand thermoset and thermoplastic materials. Exemplary materials may include, but are not limited to polyester, polyethylene (PE), polyvinylidene fluoride (PVDF), polytetrafluoroethylene (PTFE), and fluorinated ethylene propylene (FEP)—just to name a few.

In some embodiments, apparatus 100 may comprise a first sensor 105 that senses the outer diameter of stock tubing 110. A first puller 115 may draw tubing 110 from a spool. As will be described in greater detail below, the velocity with which first puller 115 draws tubing 110 from the spool may be selectively varied to control the exposure of tubing 110 to heat and/or pressure as it passes through a heating chamber 135. A corresponding second puller 120 is disposed at an opposing end of apparatus 100 and pulls and directs expanded tubing 125 away from a cooling chamber 140. As with first puller 115, the velocity with which second puller 120 transfers expanded tubing 125 may be selectively varied according to operational requirements. A second sensor 130 may be disposed before second puller 120 to measure the outer diameter of expanded tubing 125 to ensure that apparatus 100 is expanding tubing 110 to the desired outer diameter. In some instances, apparatus 100 may provide selective adjustment of expansion of the tubing 110 within the expansion chamber 145 when a measured diameter of the expanded tubing 125 deviates from an expected diameter. That is, if second sensor 130 detects that the outer diameter of expanded tubing 125 is smaller than an expected to threshold diameter various operational characteristics of apparatus 100 may be modified to ensure that expanded tubing 125 has the proper diameter, as will be discussed greater detail below.

It is noteworthy that first and second sensors 105 and 130 may comprise any type of sensor that is capable of determining the outer diameter of a tubular member, such as expanded tubing 125.

Apparatus 100 may comprise a heating chamber 135 that receives tubing 110 and heats tubing 110 to a specified temperature, also referred to as the expansion temperature. The expansion temperature for tubing 110 may depend upon the material properties of the material used to fabricate the tubing 110. In general, a range of expansion temperatures for thermoplastic polymers or fluoropolymers may include a range of temperatures from approximately 250° F. to 650° F., inclusive. Correspondingly, a cooling chamber 140 may be disposed downstream of an expansion chamber 145, which will be described in greater detail below with reference to FIGS. 2A and 2B. Cooling chamber 140 may allow expanded tubing 125 exiting expansion chamber 145 to cool, which allows expanded tubing 125 to set and retain its expanded outer diameter.

Figure 2A:
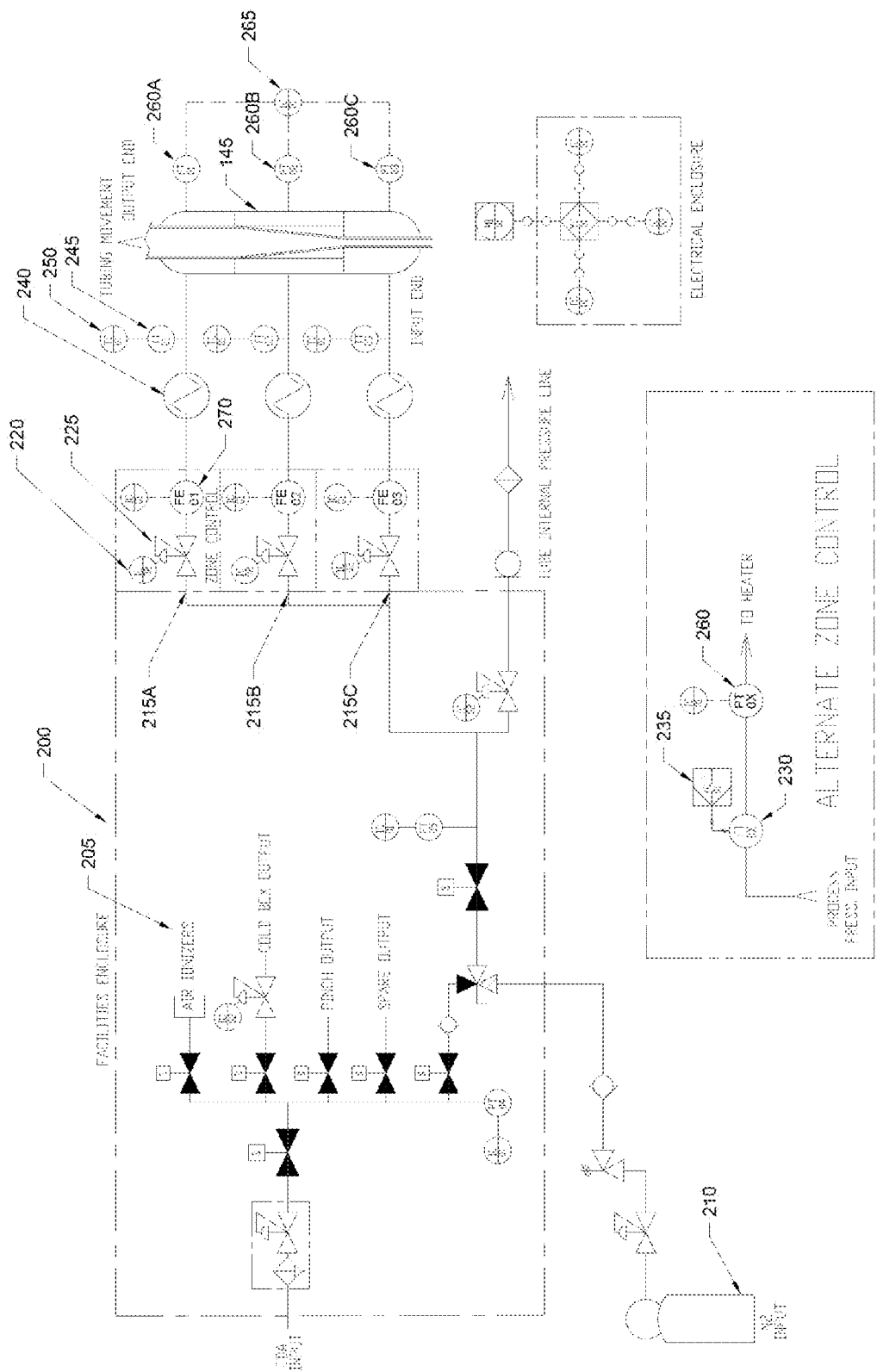
FIG. 2A is a schematic diagram that includes an exemplary expansion chamber and associated control mechanism of the apparatus of FIG. 1.

FIGS. 2A and 2B collectively illustrate a schematic diagram of a portion of apparatus 100. Generally, the schematic diagram illustrates portions of expansion chamber 145 in combination with fluid supply and control members. In some instances, expansion chamber 145 may be integrated within heating chamber 135.

A facilities enclosure 200 provides compressed dry air (CDA) which may be processed using air ionizers 205. Various outputs may direct the CDA into a plurality of lines, such as lines 215A, 215B, and 215C. The lines provide a path for the communication of fluids from the compressed dry air and/or nitrogen into expansion chamber 145. It will be understood that while compressed dry air has been described, the apparatus 100 may utilize any suitable fluidized gas. A nitrogen input 210 is also provided for introducing nitrogen gas into expansion chamber 145. In some instances, the nitrogen may be utilized within the cooling chamber 140.

According to some embodiments, each of the lines 215A, 215B, and 215C may be constructed and controlled similarly to one another. Therefore, for the purposes of brevity, only line 215A will be described in greater detail. Additionally, various output and sensing members associated with the line 215A may be communicatively coupled with a control member (e.g., control module 400 of FIG. 4) that automatically controls various components of apparatus 100. The control member will be described in greater detail below with reference to FIGS. 4 and 5.

Line 215A is shown as comprising an analogue output module 220 in combination with an electronic regulator 225. The electronic regulator 225 and a flow sensor 270 may be utilized to selectively control the flow of fluid through line 215A, into expansion chamber 145. Line 215A may also comprise a mass flow controller 230 which is associated with a programmable logic controller 235 and a pressure transducer 260. Generally, the mass flow controller 230, programmable logic controller 235, and pressure transducer 260 may be designed and calibrated to control the fluid flowing through line 215A at a particular range of flow rates where the electronic regulator 225 and flow sensor 270 may be designed and calibrated to control the fluid flowing through line 215A at a particular range of pressures.

Downstream of electronic regulator 225 and flow sensor 270 is a heat exchanger 240, which may be used to selectively vary the temperature of the fluid flowing through line 215A and into expansion chamber 145. Disposed between heat exchanger 240 and expansion chamber 145 is a temperature transducer 245 that measures the temperature of the fluid flowing through line 215A. Temperature transducer 245 may be communicatively coupled with a temperature input module 250, which is in turn communicatively coupled with the control module.

The line 215A is in fluid communication with at least a portion of expansion chamber 145. Moreover, lines 215B and 215C are also in fluid communication with expansion chamber 145 such that lines 215A and 215C are coupled near opposing ends of expansion chamber 145 and line 215B is in fluid communication near the center of expansion chamber 145. The lines 215A-C are in fluid communication with various points along expansion chamber 145, allowing for introduction of fluid along the length of expansion chamber 145.

A pressure sensor may be disposed on an opposing side of expansion chamber 145 relative to the side on which line 215A and expansion chamber 145 interface with one another. For example, pressure sensor 260A may sense the pressure of the fluid flowing within expansion chamber 145. Again, the apparatus 100 may include a pressure sensor for each line associated with expansion chamber 145. Additionally, while expansion chamber 145 is shown as comprising three lines 215A-C and three pressure sensors 260A-C, apparatus 100 may include additional or fewer lines and pressure sensors than those shown in FIG. 2A.

Figure 4:
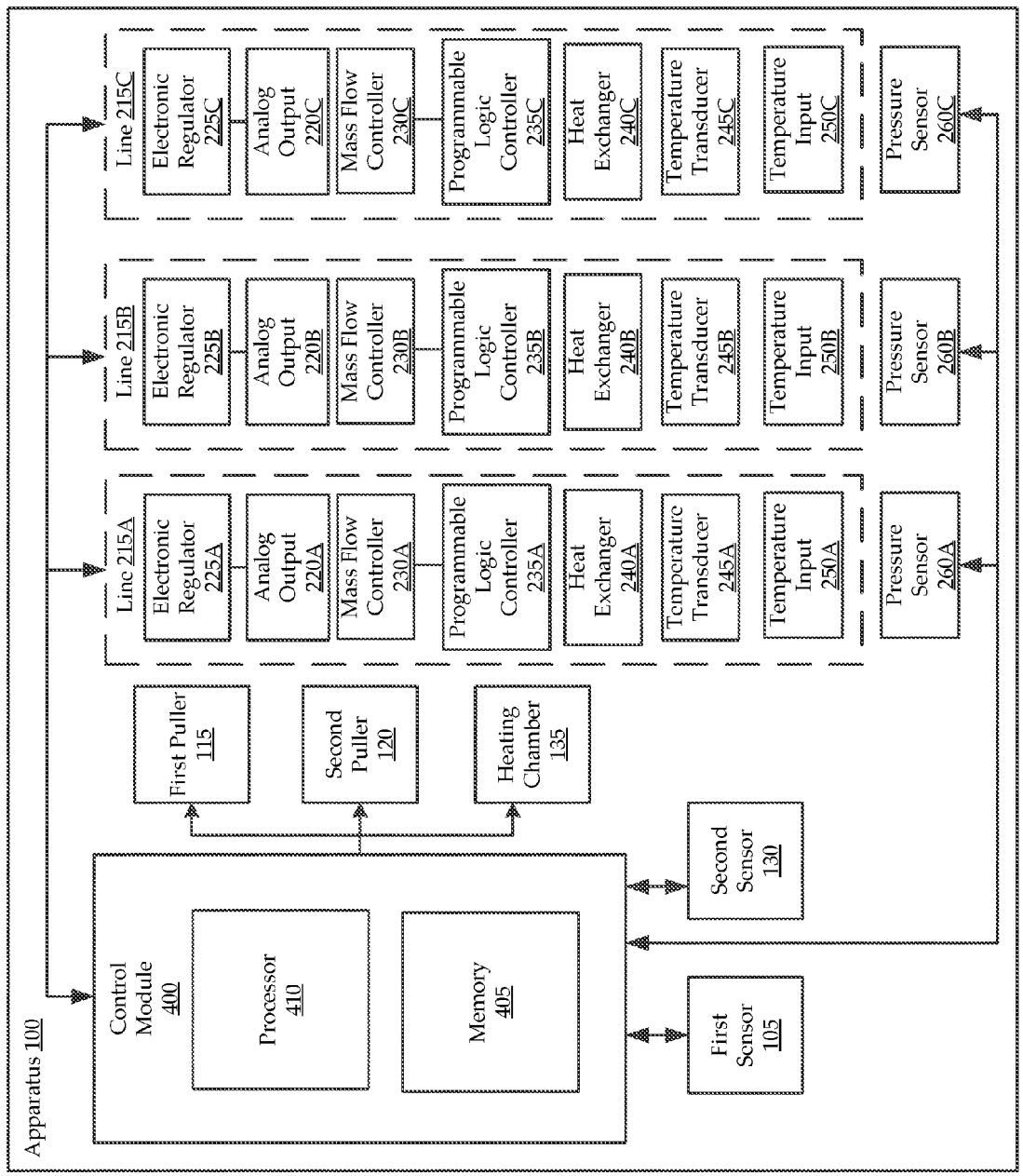
FIG. 4 is a schematic diagram of a control module which is communicatively coupled to components of the apparatus of FIG. 1.
Figure 5:
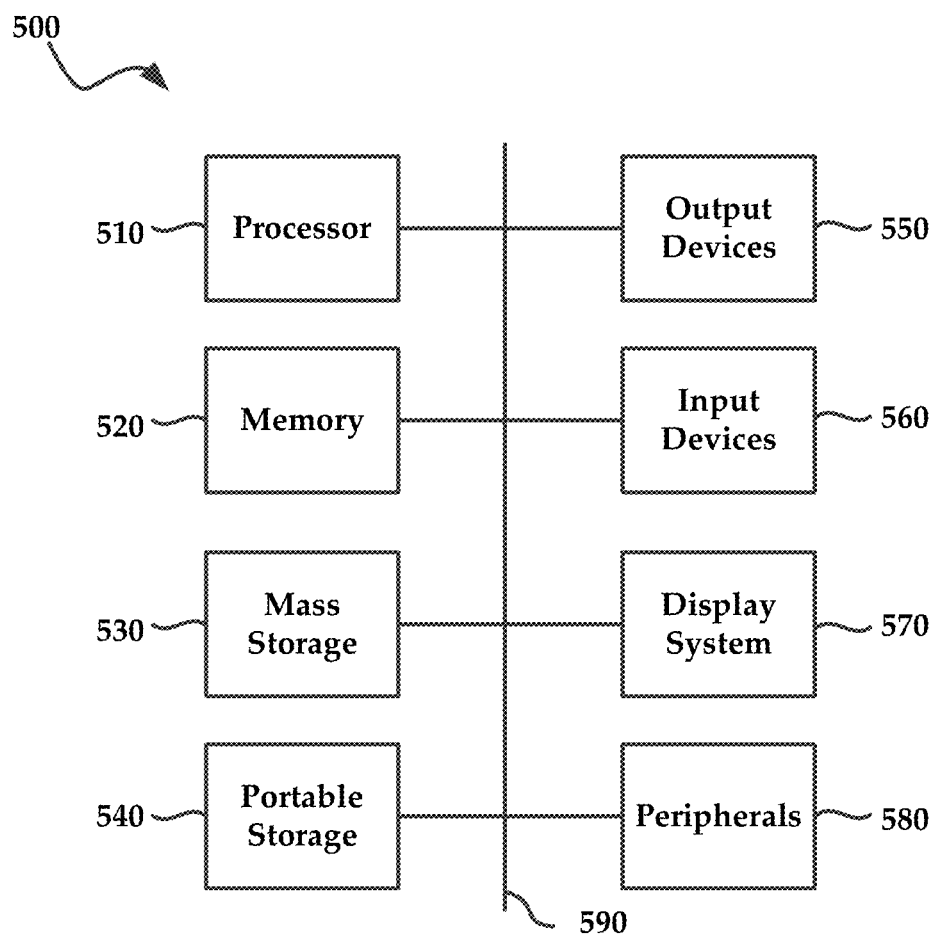
FIG. 5 illustrates an exemplary computing system that may be used to implement embodiments according to the present technology.

The pressure sensors 260 A-C of lines 215A-C may each be communicatively coupled with an analog input module 265 that is communicatively coupled with the control module 400 of apparatus 100 (again, see FIGS. 4 and 5).

In operation, stock tubing 110 is fed into heating chamber 135 to increase the temperature of tubing 110 to a suitable expansion temperature. The heated tubing is then communicated into expansion chamber 145. A first fluid is pumped through the tubing 110 to expand tubing 110 to a desired diameter. The application of temperature and pressure to tubing 110 comprises a method of thermoforming tubing 110.

Figure 3:
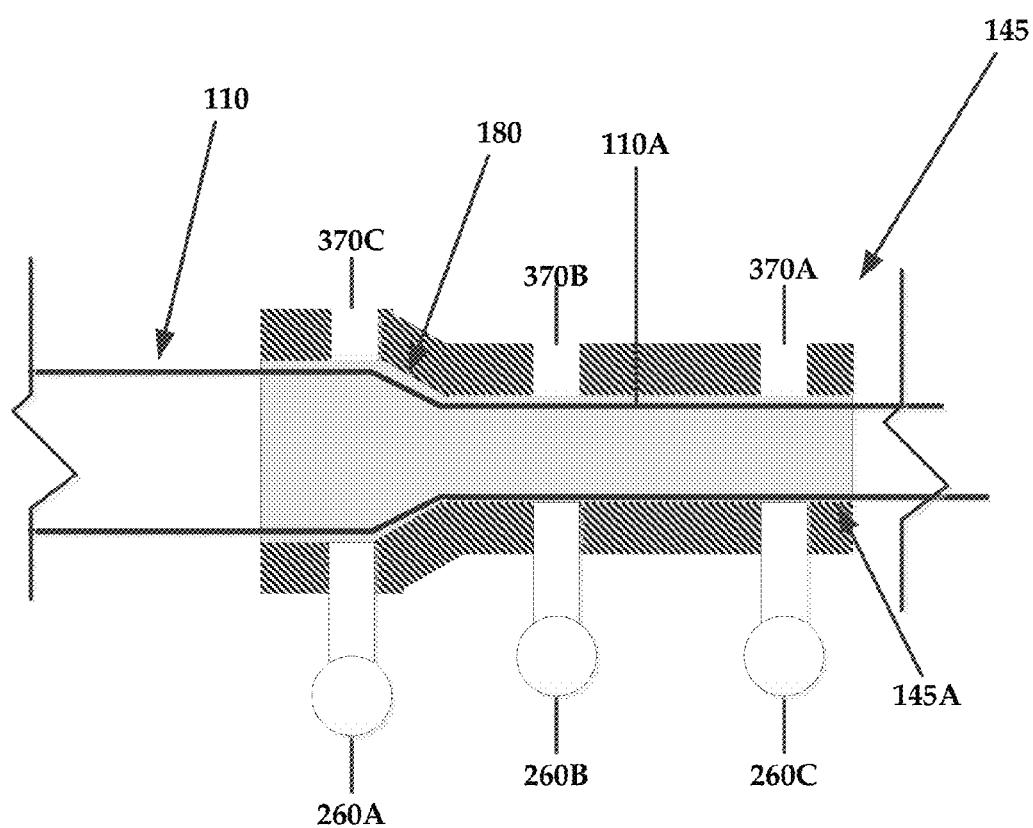
FIG. 3 is a cross-sectional view of a portion of an expansion chamber.

FIG. 3 is a cross sectional view of a portion of an expansion chamber. Fluid may be directed through inlets 370A-C of lines 215A-C and into expansion chamber 145. The temperature and volume of fluid introduced into expansion chamber 145 may be selectively controlled via the control module 400 of FIG. 4 to cause fluid pressure between an inner sidewall 145A of expansion chamber 145 and an outer sidewall 110A of tubing 110 to subsist at a level which substantially prevents outer sidewall 110A of tubing 110 from contacting inner sidewall 145A of expansion chamber 145. That is, the pressure sensors 260 A-C may indicate when the heated tubing has expanded excessively so as to block one or more of the interfaces (inlets 370A-C) between one or more of the lines 215A-C, preventing fluid from entering expansion chamber 145.

Heating exchangers, such as heat exchanger 240, associated with the lines increase the temperature of the fluid introduced into expansion chamber 145 to prevent fluid from deleteriously cooling the heated tubing as it communicates through expansion chamber 145. Indeed, fluid introduced through lines 215A-C may cool the heated tubing and prevent desired expansion of tubing 110.

In some instances, pressure sensors 260 A-C opposite the line inputs 370 A-C on the expansion chamber 145 indicate whether a forming bubble 180 of the expanding tubing is blocking an inlet of a line. Generally, the forming bubble 180 is the point at which an expansion of the tubing occurs within expansion chamber 145. In various embodiments, the forming bubble 180 may be a step transition of diameters between expanded tubing 125 and tubing 110. In some embodiments, the forming bubble 180 may cover at least a terminal (e.g., last downstream) inlet. If the bubble 180 covers the middle inlet (e.g., input associated with line 215B), the control module 400 may selectively adjust various operational characteristics of apparatus 100 to ensure that the forming bubble 180 covers only the last inlet. For example, the control module 400 may increase the velocity or amount of fluid flowing through upstream inlets. Alternatively or additively, the control module 400 may selectively adjust the temperature applied to the tubing via the heating chamber.

If the forming bubble 180 covers the first inlet, the control module 400 may selectively adjust operational characteristics to avoid the tubing sticking within expansion chamber 145. For example, the velocity or amount of fluid passed through the inlets 370A-C may be increased to increase the pressure exerted on the outer sidewall of the tubing. This effectively counteracts the expansion pressure exerted by the first fluid that is pumped into the tubing. Alternatively, the pressure of the first fluid may be decreased to reduce expansion of the tubing.

If all three inlets 370 A-C are covered by the forming bubble 180, injected hot air may not enter expansion chamber 145, preventing expansion of the tubing 110. Once the tubing 110 ceases expansion, a process discontinuity may occur. While this discontinuity reopens the inlets, it creates a manufacturing defect which needs to be removed from the output product, increasing manufacturing costs.

FIG. 4 illustrates a schematic diagram of a control module 400 that controls operation of the various selectively adjustable components of apparatus 100. For example, the control module 400 may include logic that is stored in memory 405. This logic may be executed by a processor 410 within control module 400 to effectuate one or more of the functions or methods described herein. In some instances, various portions of logic executed by control module 400 may be distributed to various programmable logic controllers described herein. These individual logic controllers may cooperatively control the operational characteristics of apparatus 100.

In some instances, the control module 400 may be embodied in a computing system such as the computing system of FIG. 5, described in greater detail below.

The control module 400 may be communicatively coupled with and control the feed rates of the first and second pullers 115 and 120, respectively. Additionally, the control module 400 may be communicatively coupled with and control the flow rate of fluid through the lines via mass flow controllers, such as electronic regulator 225 of line 215A or the alternate version mass flow controller 230 of line 215A. The control module 400 may be communicatively coupled with and control the temperature of the fluid via temperature input modules, temperature transducer modules, and heat exchangers of lines 215A-C. The control module 400 may be communicatively coupled with each of the pressure sensors, as well as heating chamber 135.

Generally, the temperature required to heat the tubing to a desired expansion temperature may be related to tubing velocity (e.g., speed with which the pullers communicate the tubing through the apparatus) and the internal fluid pressure within the tubing that allows for the tubing to expand. In some instances, the faster the tubing is pulled through the apparatus, the higher the temperature needs to be within the heating chamber in order for the heat to sufficient penetrate the tubing and raise the tubing to the expansion temperature. As internal pressure increases, the resistance of the tubing against expansion decreases, forcing the tube to expand. Advantageously, the control module 400 may maximize the velocity of the tubing translating through the apparatus.

As an aside, disposing the expansion chamber within the heating chamber may allow for preheating of the tubing such that the expansion temperature may be reached sooner prior to the injecting of hot air onto the tubing, which may inadvertently increase the temperature of the tubing over the expansion threshold. The length or other dimensions of the heating chamber or the position of the expansion chamber within the heating chamber may be selectively varied to increase the maximum output of the apparatus.

In some instances, the control module 400 may selectively vary the pressure of the fluid injected into the expansion chamber such that the injected fluid pressure between the expansion chamber and the expanding tubing is slightly higher than the internal pressure of the fluid used to expand the tubing to reduce the likelihood that the tubing will stick to the inner sidewall of the expansion chamber. Since the pressure at the various inlets of the expansion chamber is each individually adjustable, the direction of the fluid flowing through the expansion chamber may be modified. As the heated fluid flows into the inlets, additional heat may be applied to the expanding tubing which may induce more expansion of the tubing.

Additionally, flow of fluid within the expansion chamber may indicate movement of the forming bubble 180. As the flow changes due to injection points being covered, the pressure of the injected fluid can be increased to move the forming bubble 180 away from a particular inlet or inlets and maintain proper flow. The last injection point will generally be covered with minimal flow and less heat as the last inlet may be utilized to reduce the likelihood that the expanding tube will stick to the expansion chamber and cool therein. A midline injection point (e.g., inlet of line 215B) is the main location where fluid pressure can be varied to prevent the bubble from covering the first or second inlet and preventing or substantially reducing fluid flow. The first injection point provides a mechanism for controlling preheating of the tubing and preventing the fluid injected through the middle inlet from exiting the inlet end of the expansion chamber.

FIG. 5 illustrates an exemplary computing system 500 that may be used to implement an embodiment of the present systems and methods. The system 500 of FIG. 5 may be implemented in the contexts of the likes of computing systems, networks, servers, or combinations thereof. The computing system 500 of FIG. 5 includes one or more processors 510 and main memory 520. Main memory 520 stores, in part, instructions and data for execution by processor 510. Main memory 520 may store the executable code when in operation. The system 500 of FIG. 5 further includes a mass storage device 530, portable storage device 540, output devices 550, user input devices 560, a display system 570, and peripheral devices 580.

The components shown in FIG. 5 are depicted as being connected via a single bus 590. The components may be connected through one or more data transport means. Processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 may store the system software for implementing embodiments of the present invention for purposes of loading that software into main memory 520.

Portable storage device 540 operates in conjunction with a portable non-volatile storage medium, such as a floppy disk, compact disk, digital video disc, or USB storage device, to input and output data and code to and from the computer system 500 of FIG. 5. The system software for implementing embodiments of the present invention may be stored on such a portable medium and input to the computer system 500 via the portable storage device 540.

User input devices 560 provide a portion of a user interface. User input devices 560 may include an alphanumeric keypad, such as a keyboard, for inputting alpha-numeric and other information, or a pointing device, such as a mouse, a trackball, stylus, or cursor direction keys. Additional user input devices 560 may comprise, but are not limited to, devices such as speech recognition systems, facial recognition systems, motion-based input systems, gesture-based systems, and so forth. For example, user input devices 560 may include a touchscreen. Additionally, the system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information, and processes the information for output to the display device.

Peripheral device(s) 580 may include any type of computer support device to add additional functionality to the computer system 500. Peripheral device(s) 580 may include a modem or a router.

The components provided in the computer system 500 of FIG. 5 are those typically found in computer systems that may be suitable for use with embodiments of the present invention and are intended to represent a broad category of such computer components that are well known in the art. Thus, the computer system 500 of FIG. 5 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A process, comprising:
heating tubing to an expansion temperature;

expanding the heated tubing within an expansion chamber by injecting a first fluid within the heated tubing to expand the heated tubing; and constraining expansion of the heated tubing within the expansion chamber by introducing a second fluid between an outer sidewall of the heated tubing and an inner sidewall of the expansion chamber.

2. The process according to claim 1, wherein the second fluid is introduced into the expansion chamber at inlets disposed along the expansion chamber.

3. The process according to claim 2, further comprising selectively adjusting a temperature of the second fluid communicating through each of the inlets.

4. The process according to claim 1, further comprising translating the heated tubing through the expansion chamber at a feed rate.

5. The process according to claim 4, further comprising selectively adjusting any of the feed rate, a temperature of the tubing, a pressure of the first fluid, and a pressure of the second fluid to maximize a length of tubing which is expanded.

6. The process according to claim 1, further comprising controlling location of a forming bubble within the expansion chamber.

7. The process according to claim 6, further comprising selectively adjusting the location of the forming bubble by selectively adjusting a flow rate of fluid through each of the plurality of inlets.

8. The process according to claim 1, further comprising selectively modifying any of a velocity of the tubing within the expansion chamber and the temperature of the tubing to maximize output of expanded tubing.

9. The process according to claim 1, further comprising selectively adjusting a pressure of the second fluid within the expansion chamber to selectively vary expansion of the tubing.

10. The process according to claim 1, further comprising selectively adjusting any of a flow rate and a temperature of the second fluid flowing through each of the plurality of inlets.

11. The process according to claim 1, further comprising maintaining a pressure of the first fluid within the expanded tubing during cooling.

12. The process according to claim 1, further comprising selectively adjusting expansion of the tubing within the expansion chamber when a measured diameter of the expanded tubing deviates from an expected diameter.

13. A product of the process of claim 1.

* * * * *